(12) United States Patent
Maloisel et al.

(10) Patent No.: US 7,510,657 B2
(45) Date of Patent: Mar. 31, 2009

(54) METHOD OF PREPARING AFFINITY LIGANDS

(75) Inventors: Jean-Luc Maloisel, Uppsala (SE); Nicolas Thevenin, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 470 days.

(21) Appl. No.: 10/547,569

(22) PCT Filed: Mar. 5, 2004

(86) PCT No.: PCT/SE2004/000315

§ 371 (c)(1),
(2), (4) Date: Aug. 29, 2005

(87) PCT Pub. No.: WO2004/078310

PCT Pub. Date: Sep. 16, 2004

(65) Prior Publication Data

US 2006/0188931 A1   Aug. 24, 2006

(30) Foreign Application Priority Data

Mar. 5, 2003   (SE) .................................... 0300624

(51) Int. Cl.
*B01D 15/08* (2006.01)
*B01J 20/22* (2006.01)
(52) U.S. Cl. .................. 210/635; 210/198.2; 210/656; 536/18.5; 536/17.6; 536/53; 536/124; 549/63; 564/84; 564/139; 564/142

(58) Field of Classification Search ............... 564/84, 564/139, 142; 549/63; 536/18.5, 17.6, 53, 536/124; 210/198.2, 635, 656
See application file for complete search history.

(56) References Cited

U.S. PATENT DOCUMENTS 4,837,348 A   6/1989   Stolowitz et al.

FOREIGN PATENT DOCUMENTS

| EP | 0165800 | 12/1985 |
|---|---|---|
| EP | 0611592 | 8/1994 |
| WO | WO 01/16372 | 3/2001 |

OTHER PUBLICATIONS

Feist, P., et al., "Sulfhydrylcellulose: A New Medium for Chromatography of Mercurated Polynucleotides", *Biochemistry*, vol. 20, No. 15, 1981, p. 4243-4246.

*Primary Examiner*—Peter G O'Sullivan
(74) *Attorney, Agent, or Firm*—Yonggang Ji

(57) ABSTRACT

The present invention is a method of preparing affinity ligands, which method comprises to provide a cyclic scaffold comprising a thiol group, a carbonyl group and an amine group; to derivatize the amine group of said scaffold with an electrophile that carries either a functionality capable of affinity interaction or a functionality capable of a second interaction with a target molecule; and to open up the derivatized scaffold and add an amine that carries either a functionality capable of a second interaction or a functionality capable of affinity interaction with a target molecule. The method provides provide affinity ligands, which are capable of affinity interaction as well as a second kind of interaction.

13 Claims, 4 Drawing Sheets

METHOD OF PREPARING AFFINITY LIGANDS

CROSS REFERENCE TO RELATED APPLICATIONS

This application is a filing under 35 U.S.C. § 371 and claims priority to international patent application number PCT/SE2004/000315 filed Mar. 5, 2004, published on Sep. 16, 2004 as WO 2004/078310 and also claims priority to patent application number 0300624-4 filed in Sweden on Mar. 5, 2003; the disclosures of which are incorporated herein by reference in their entireties.

TECHNICAL FIELD

The present invention relates to a method of preparing optimised affinity ligands and a method of preparing a separation from said ligands by immobilisation to a base matrix. The invention also encompasses ligands and separation media prepared according to the invention. In addition, the invention encompasses a kit for preparing affinity ligands.

BACKGROUND

The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions (partitions) many times before the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in the order of increasing interaction with the stationary phase. The least retarded component elutes first, the most strongly retained material elutes last. Separation is obtained when one component is retarded sufficiently to prevent overlap with the zone of an adjacent solute as sample components elute from the column.

One kind of chromatography, which is widely used for biotechnological applications, is affinity chromatography. More specifically, affinity chromatography is a highly specific mode of chromatography wherein molecular recognition process takes place between a biospecific ligand and a target substance by a principle of lock-key recognition, which is similar to the enzyme binding to a receptor. For a general review of the principles of affinity chromatography, see e.g. Wilchek, M., and Chaiken, I. 2000. An overview of affinity chromatography. *Methods Mol. Biol.* 147: 1-6.

One advantageous class of affinity ligands comprises amine groups or acid groups. In the manufacture of such ligands, the amine groups or acid groups are often coupled to solid supports via the formation of an amide bond trough the activation of the carboxylic acid. In both cases, the formation of this type of chemical bond is not very efficient and is resulting in side products and media with poor homogeneity. For example, immobilisation of a NHS ester-activated ligand to an amine-derivatised support is never fully complete and some non-reacted amine groups will remain present. The same problem appears for the immobilisation of amine containing ligands to an ester activated derivatised support, in this case not reacted acid groups are remaining in the final media. Capping of these groups is as well possible, but the final product will still remain heterogeneous.

Accordingly, in this field, there is a need of alternative methods for generation of novel affinity ligands as well as for preparation of separation media thereof. There is also a need of optimising the binding properties of already known affinity ligands.

Finally, Feist and Danna ("Sulfhydryl cellulose: A New Medium for Chromatography of Mercurated Polynucleotides". Patricia L. Feist and Kathleen J. Danna, Biochemistry, 20(15), p. 4243-4246) have disclosed a process of preparing sulfhydryl cellulose, which process includes to mix amino ethyl cellulose with an N-acetylhomocysteine thiolactone.

SUMMARY OF THE PRESENT INVENTION

One object of the present invention is to provide a method of preparing affinity ligands, which allows preparation of ligands of modified specificity and selectivity. This can be achieved by a method as defined in claim 1.

A specific object of the present invention is to modify the characteristics of an already defined affinity ligand. This can be achieved according to the present invention by adding a further interaction to the known affinity ligand, which further interaction is specific for a site of the target molecule which is separate from the known ligand's site of interaction.

A further object is to provide such a method, which provides a simple synthetic pathway while it enables a diversity of different ligands to be prepared.

Yet a further object is to provide such a method, which results in ligands that are easy to immobilise to a base matrix in order to prepare a separation medium.

Thus, an additional object of the invention is to provide an affinity separation medium, which results in a homogenous medium.

One or more of the above-defined objects can be achieved by the invention as defined by the claims. Further objects and advantages of the present invention will appear from the detailed description that follows.

DEFINITIONS

Figure 1:
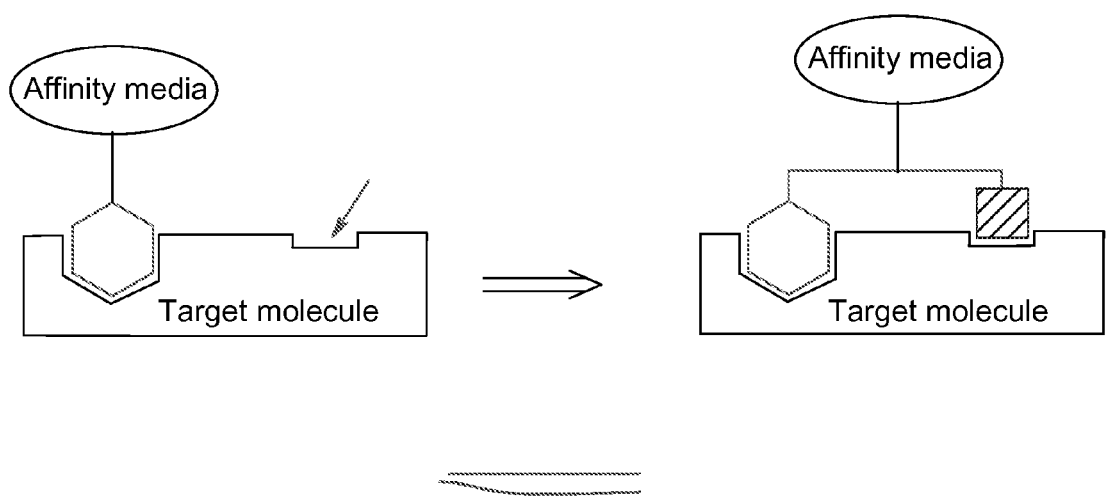
FIG. 1 shows the concept of attachment used in the present invention, wherein a further site that provides.

The term "separation medium" is used herein for a material useful e.g. as packing of a chromatography column, and more specifically consists of one or more ligands coupled to a base matrix. Thus, the base matrix acts as a carrier, while the ligands provide functionalities that interact with target substances in chromatography.

The term "spacer" is used for a chemical entity that distances a ligand from the base matrix.

The term "ligand" means herein a chemical entity capable of binding target substances. Such target substances may be either a compound, which it is desired to isolate or remove by chromatography, or alternatively an analytical target substance.

The term "functionality" is used herein for a group or a molecule, which is functional in the sense that it is capable of interacting with a target molecule, or target compound.

In the present specification, the term "target molecule" is frequently used in the context of interaction. As the skilled person in this field will understand, the target may be a molecule or a compound.

DETAILED DESCRIPTION OF THE INVENTION

In a first aspect, the present invention is a method of preparing at least one affinity ligand, which method comprises
(a) providing a cyclic scaffold comprising a thiol group, a carbonyl group and an amine group;
(b) derivatising the amine group of said scaffold with an electrophile that carries either a functionality capable of affinity interaction or a functionality capable of a second interaction with a target molecule; and
(c) opening up the cyclic structure of the derivatised scaffold and adding to the carbonyl carbon an amine that carries either a functionality capable of a second interaction or a functionality capable of affinity interaction with a target molecule;

to provide a ligand capable of affinity interaction with one site of a target molecule and a second functionality capable of interacting with another site of the same target molecule. Thus, the ligands prepared according to the invention are multimodal ligands, wherein one kind of interaction is affinity-based.

In the preferred embodiment of the present method, the functionality that is capable of providing affinity interaction is an already defined affinity ligand, sometimes herein denoted a known ligand. Accordingly, the present method is advantageously used as a method of optimising the characteristics, e.g. the specificity, of a known ligand. Characteristics of an affinity ligand can be modified in any desired way, e.g. in order to increase or decrease the binding strength of the ligand for an improved adsorption or desorption, respectively.

In one embodiment of the present method, step (b) is a derivatisation with an electrophilic carboxyl acid carrying a functionality capable of affinity interaction and step (c) adds an amine that carries a second functionality.

In an alternative embodiment of the present method, step (b) is a derivatisation with an electrophile carrying a second functionality and step (c) adds an amine that carries a functionality capable of affinity interaction.

More specifically, in one embodiment of the present method, in step (a), the scaffold is defined by the general formula (I)

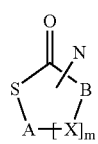

(I)

wherein A, B and X irrespective of each other are carbon atoms or any heteroatoms, such as oxygen, sulphur, nitrogen and/or silica, m is any integer between 0 and 4, such as 1-3, preferably 1 or 2, and the functional group N is a nitrogen, which either replaces one X or is attached to any one of A, B and X.

In one advantageous embodiment, in formula (I), A, B and X are carbon atoms. In the most preferred embodiment at present, in formula (I), m is 1 and the scaffold is homocysteine thiolactone. However, depending on the desired size of the ligand, the value of m can be varied within wide limits, e.g. 2-100, such as 5-10.

In step (b), the electrophile is selected from the group that consists of carbon-carbon double bonds; C—Y, wherein Y represents for example a halogen, such as Br, I, Cl, or a mesylate, or a tosylate group; or an acid or an activated acid, such as WC=O, or $WS(O)_2$, wherein W is for example formed from halogen atoms, N-hydroxysuccinimide, pentafluorophenol, para-nitrophenol or isopropyl chloroformate. Thus, in one specific embodiment, the electrophile is a carboxylic acid.

The affinity interaction can utilise any suitable member of an affinity pair. Many such affinity pairs are well known in this field, but it is also possible to use less well-known members, which have been identified by careful screening. Thus, in one embodiment, the functionality capable of affinity interaction is one member of an affinity pair selected from the group that consists of avidin-biotin; aliphatic acid/BSA etc.

Further, the second functionality capable of interacting with another site of the same target molecule can be an additional member of an affinity pair, which however is directed to another site of the target molecule than the above-discussed functionality capable of affinity interaction. Consequently, in one embodiment, the present method provides a ligand comprising two affinity groups, which can be selected from the above-mentioned.

In another embodiment, the second functionality capable of interacting with another site of the same target molecule provides an interaction of a nature different to affinity, such as a charged group, a hydrophobic group, a hydrophilic group, hydrogen bonds, electron donor/acceptors etc.

Accordingly, by the second functionality, an additional interaction centre is introduced, which can act as an enhancer, i.e. to increase the binding of target, a discriminator, i.e. to increase the selectivity, or a modulator, i.e. to modify the elution conditions.

Thus, depending on the desired target molecule, the skilled person can easily design an affinity ligand, which provides a larger 3D interaction with the target molecule than the known, or previously identified, affinity ligand alone. Thus, linking together to produce larger fragments and by introducing new centres of interaction enables the preparation of ligands with improved affinity and selectivity, or otherwise modified characteristics.

In one embodiment of the present method, steps (a) and (b) have been performed earlier to provide a ready-derivatised scaffold. Thus, the starting material is then a scaffold, which has been derivatised earlier or even elsewhere.

As appears from the above, step (c) is an aminolysis reaction. The conditions for performing such a reaction are easily decided by the skilled person in this field, with due consideration of the pKa and the nucleophilicity of the amine used.

In an advantageous embodiment, the product obtained from step (c) is immobilised via its thiol group to a base matrix in order to produce an affinity separation medium comprising a plurality of affinity ligands prepared according to the invention. Since the thiol group is a strong nucleophile, ligands prepared as described above can easily be immobilised to provide homogenous media with a level of substitution that can be controlled without difficulty. In addition, after having identified one specific affinity group, the invention allows, via the introduction of the second interaction, a general screening for more specific characteristics. Thus, separation media according to the invention can be optimised towards a specific application, or towards specific conditions. A further advantage of the present method is that it results in a homogenous medium and few side products, in fact the only side product is a glycerol derivative, which should not interfere in the affinity interaction.

In one embodiment, the thiol group of the ligand prepared is coupled to allyl groups of the base matrix. (For a general review of immobilisation techniques, see e.g. see e.g. Immobilized Affinity Ligand Techniques, Hermanson et al, Greg T. Hermanson, A. Krishna Mallia and Paul K. Smith, Academic Press, INC, 1992.)

In a second aspect, the present invention relates to the use of homocysteine thiolactone as a starting material in the preparation of at least one affinity ligand, which ligand comprises a first functionality capable of affinity interaction with one site of a target molecule and a second functionality capable of interacting with another site of the same target molecule. Homocysteine thiolactone is commercially available, e.g. from Aldrich, catalogue no. H1, 580-2, and CAS no. 6038-19-3.

The present invention also encompasses a kit comprising a scaffold, such as homocysteine thiolactone, one or more derivatisation agents and one or more suitable amines for ring-opening, together with written instructions for the use thereof. Such instructions may comprise one or more of the details given above in relation to the method according to the invention. In an alternative embodiment, the kit comprises a derivatised scaffold and a suitable amine for ring-opening, together with written instructions for the use thereof.

In a third aspect, the present invention is an affinity ligand, which comprises a first functionality capable of affinity interaction with one site of a target molecule and a second functionality capable of interacting with another site of the same target molecule. In one embodiment, the present ligand has been prepared as described above. The ligand according to the invention is a multimodal ligand, which comprises a site capable of affinity interaction as well as a second site capable of an additional interaction.

In a fourth aspect, the present invention is a separation medium, which comprises a plurality of ligands according to the invention immobilised to a base matrix. The present separation medium is useful for isolation of desired target substances, removal of undesired target substances from a desired liquid, for analytical purposes etc. Illustrative examples of target substances are e.g. biomolecules such as proteins, e.g. antibodies, peptides, nucleic acids, such as DNA and RNA, plasmids, oligonucleotides, virus, cells etc. Illustrative examples of undesired target substances are pyrogens, toxins, etc.

Thus, in the case where the separation medium is intended for use in affinity chromatography, the base matrix is commonly in beaded form, such as a gel, or in monolithic form. In alternative embodiments, the base matrix can e.g. be a membrane, a filter, one or more chips, surfaces, capillaries etc.

In one embodiment, the base matrix is a natural polymers, preferably in the form of porous beads, which are easily performed by the skilled person in this field according to standard methods, such as inverse suspension gelation (S Hjertén: Biochim Biophys Acta 79(2), 393-398 (1964) or spinning disk technique (see e.g. WO 88/07414 (Prometic Biosciences Inc)). Alternatively, natural polymer beads are obtained from commercial sources, such as Amersham Biosciences AB, Uppsala, Sweden. Illustrative tradenames of such useful natural polymer beads are e.g. of the kind known as Sepharose™ or Sephadex™.

In another embodiment, the base matrix is a synthetic polymer, preferably in the form of porous beads, comprised of cross-linked synthetic polymers, such as styrene or styrene derivatives, divinylbenzene, acrylamides, acrylate esters, methacrylate esters, vinyl esters, vinyl amides etc. Such polymers are easily produced according to standard methods, see e.g. "Styrene based polymer supports developed by suspension polymerization" (R Arshady: Chimica e L'Industria 70(9), 70-75 (1988)). Alternatively, a commercially available product, such as Source™ (Amersham Biosciences AB, Uppsala, Sweden) can be surface-modified according to the invention.

Methods for providing base matrices with suitable reactive groups, such as reactive allyl groups, as well as activation thereof are well known in this field.

In a last aspect, the invention is a chromatography column, which has been packed with a separation medium as described above. The column can be of any desired size, such as for large-scale production or lab-scale, or suitable for analytical purpose. In a specific embodiment, the column according to the invention is provided with luer adaptors, tubing connectors, and domed nuts. Also encompassed is a kit comprising a chromatography column; a separation medium comprising the herein described multimodal ligands; and optionally liquids; in separate compartments together with instructions that describes use of the kit for isolation of biomolecules. In an alternative embodiment of his kit, the chromatography column has been replaced by a vessel suitable for batch procedures.

Finally, the invention also encompasses a process of separating a target molecule from a liquid, wherein said liquid is contacted with a separation medium according to the invention to adsorb the target molecule thereon and said medium is subsequently contacted with an eluent which releases the target molecule from the medium. In one embodiment, in the first step, a liquid comprising the target molecules is passed over a separation medium under conditions allowing adsorption of the target molecule to the ligands. Such conditions are controlled e.g. by pH and/or salt concentration i.e. ionic strength in the solution. Care should be taken not to exceed the capacity of the medium, i.e. the flow should be sufficiently slow to allow a satisfactory adsorption. In this step, other components of the solution will pass through in principle unimpeded. Optionally, the medium is then washed, e.g. with an aqueous solution, in order to remove retained and/or loosely bound substances. In a next step, a second liquid denoted eluent is passed over the medium under conditions that provide desorption i.e. release of the target molecule. Such conditions are commonly provided by a change of the pH, the salt concentration i.e. ionic strength, hydrophobicity etc. Various elution schemes are known, such as gradient elution and step-wise elution. Elution can also be provided by a solution comprising a competitive substance, which will replace the target molecule on the medium. The general principles of chromatography for separating a target substance as discussed above are well-known in this field, and the skilled person in this field can easily adopt the necessary parameters for use of the present process. In an alternative embodiment, the present process is a batch procedure, wherein the liquid is contacted with the medium in a vessel for a suitable period of time. In a specific embodiment, the present invention utilises a fluidised bed. In this embodiment, as is well known in fluidised bed technology, the base matrix has been provided with a high density filler, such as stainless steel or glass. Such base matrices are well known and commercially available.

DETAILED DESCRIPTION OF THE DRAWINGS

FIG. 1 shows the concept of multi-point attachment used in the present invention, wherein the characteristics of a known affinity ligand are modified by attachment of a second group (square), which interacts with the target molecule at a site different from the known ligands site of interaction. More specifically, to the left is illustrated a conventional affinity medium, wherein only one site of the target compound interacts with the media (shown as an oval, the interacting site of the ligand being a rhomb). To the right is illustrated a multimodal affinity medium according to the invention, which in addition interacts via a second site (square).

Figure 2:
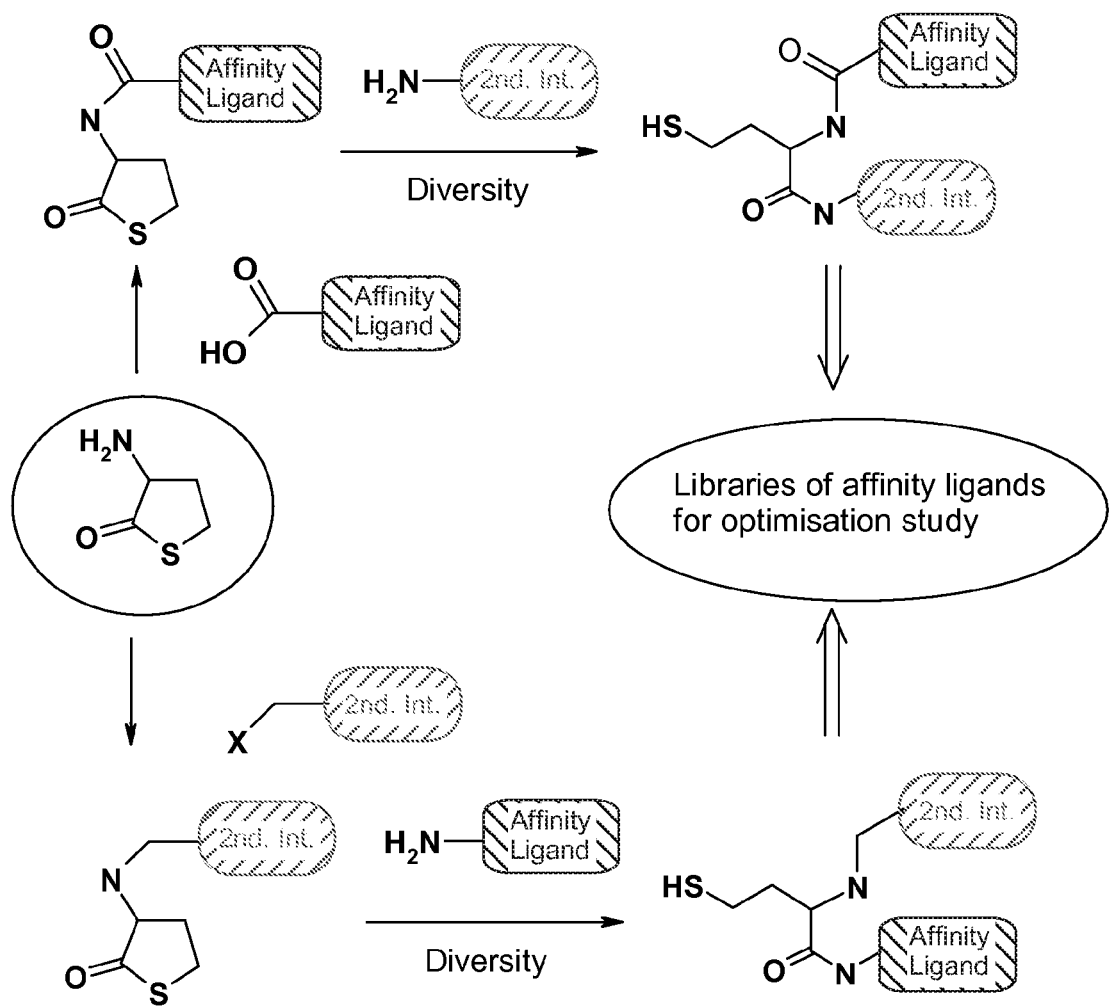
FIG. 2 illustrates by way of examples how libraries of ligands can be generated using the method of the invention.
Figure 3A:
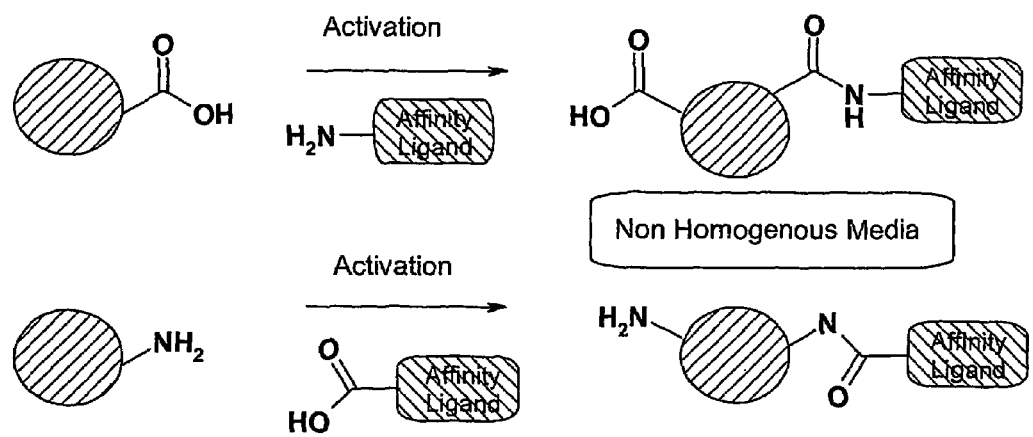
FIG. 3a shows schematically the preparation of conventional heterogeneous affinity media and 3b shows schematically how homogenous affinity media can be prepared according to the invention.
Figure 3B:
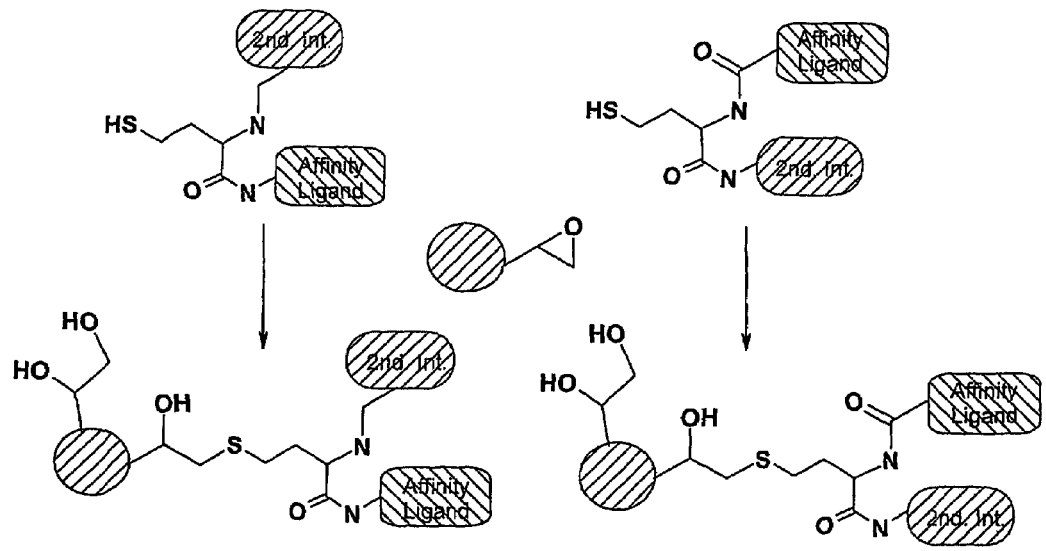

FIG. 2 illustrates by way of examples how libraries of ligands can be generated using the method of the invention, using homocysteine thiolactone as scaffold. The affinity ligand is shown with rectangles, while ovals denote second interactions. Diversity is created by adding the residue H₂N-second interaction, as illustrate with arrows going from left to right. Libraries according to the invention are e.g. useful for optimisation studies. FIG. 3a shows schematically the preparation of conventional heterogeneous affinity media and 3b shows schematically how homogenous affinity media can be prepared according to the invention. One disadvantage of the conventional preparation that appears clearly is how the base matrix is present from the beginning in the conventional pathway, requiring larger volumes and hence more costly equipment and procedures.

Figure 4:
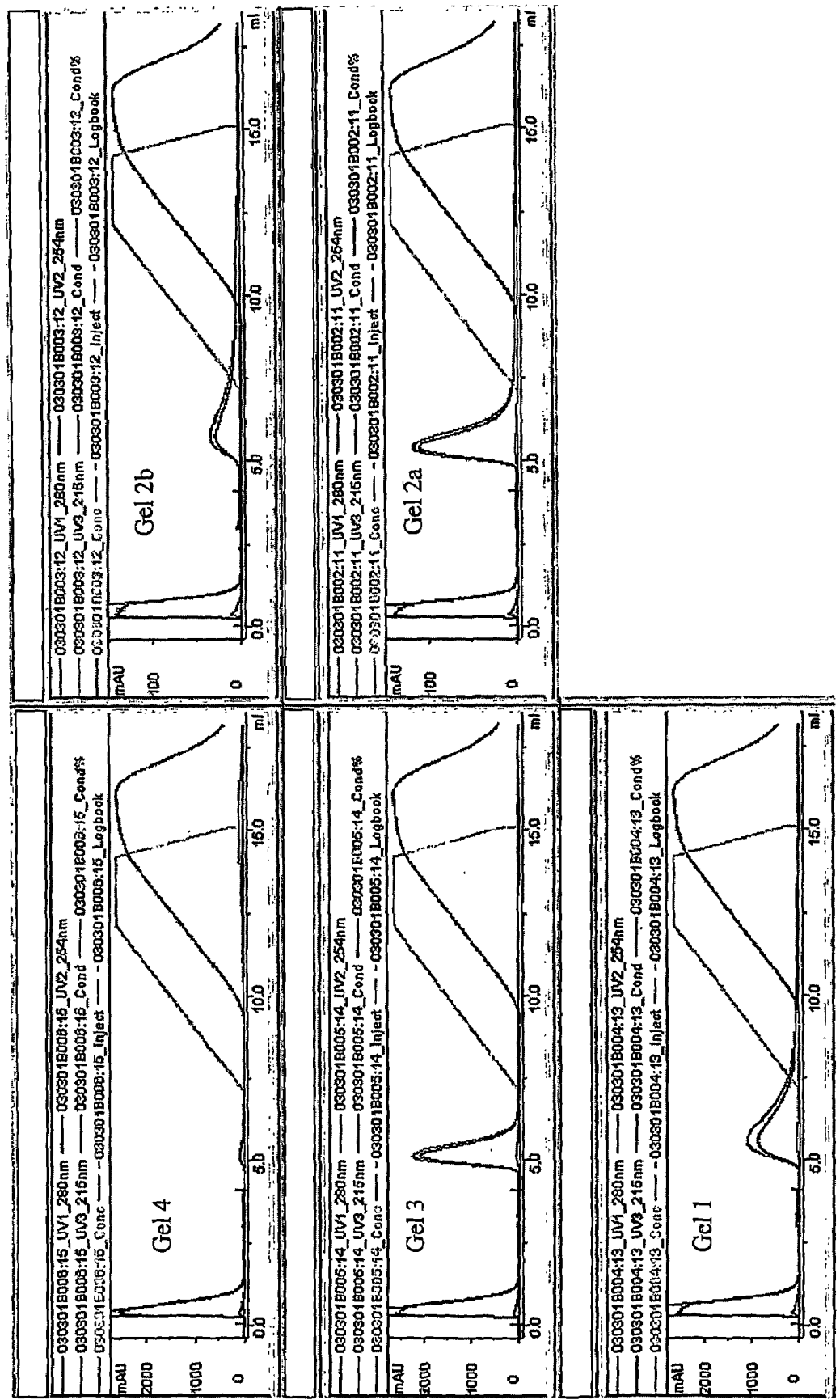
FIG. 4 shows chromatograms obtained as explained in detail in the Experimental part below.

FIG. 4 shows chromatograms, wherein elution of bovine serum albumin (BSA) is performed as explained in the experimental part below. Gels are, from left to right, gel 4 and gel 2b (top row), gel 3 and gel 2a (middle) and gel 1 (bottom).

EXPERIMENTAL PART

Below, the present invention will be described by way of examples, which are provided for illustrative purposes only and should not be construed as limiting the invention as defined by the appended claims. All references given below and elsewhere in the present specification are hereby included herein by reference.

General procedure using D,L-homocysteine thiolactone as a scaffold to generate new media for affinity chromatography:

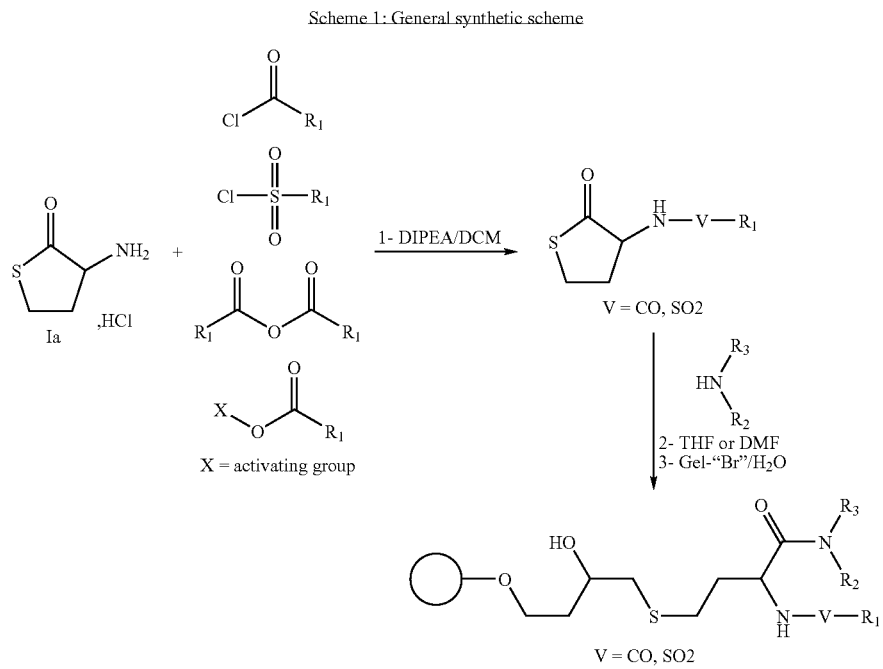

Scheme 1: General synthetic scheme

The purity and structural identity of all intermediate compounds was established by LC-MS and NMR.

General Procedure

Step 1:

A solution A of D,L-homocysteine thiolactone Ia and diisopropylethylamine (DIPEA) in dichloromethane (DCM) was cooled down to 0° C. A solution B containing an acyl chloride or a sulfonyl chloride or an anhydride or an activated acid in DCM was cooled down to 0° C., and added dropwise to the solution A maintained between 0 and 5° C. The mixture was stirred overnight at room temperature. The solvent was removed under vacuum. If necessary, the resulting product can be dissolved in ethyl acetate and washed with citric acid (10% in water w/w) solution and by potassium carbonate (10% in water w/w) solution. The organic phase was washed with water before being dried with sodium sulfate and the solvent evaporated.

Step 2:

The resulting product was dissolved in tetrahydrofuran (THF) and degassed by bubbling nitrogen for 10 min. To this solution, an amine dissolved in THF was added at room temperature. The reaction mixture was stirred for another 17 hours. After the solvent has been evaporated under vacuum, the residue was extracted with ethyl acetate and citric acid (10% in water w/w). The organic phase was washed with water before being dried with sodium sulfate and the solvent evaporated. When it was necessary, the product was purified by HPLC before step 3.

Step 3:

Sepharose™ 6 Fast Flow (Amersham Biosciences, Uppsala, Sweden) (100 ml drained gel) was mixed with 4.6 M NaOH (30 ml, 0.137 mol) and 1,4 bis-(2,3 epoxypropoxy-) butane (200 ml). The mixture was stirred for 2 h with a mechanical stirrer at 30° C. After filtration, the gel was washed with water (5×500 ml) and the pH of the gel was checked (pH 6) with aid of pH paper. The substitution level of epoxide was measured by titration after reaction with an aq. solution of $Na_2S_2O_3 \cdot 5H_2O$ 50% (w/w). The substitution level of epoxide was estimated to 15 µmol/ml gel.

The epoxy-activated gel from above was mixed with an alkaline solution of the product issued from step 2 (2.5 equivalents of ligands per epoxide group), the pH was adjusted to 12 and the mixture warmed up to 50° C. overnight. After reaction, the gel (1 volume) was filtered and washed with water (2×15 vol.), ethanol (2×15 vol.), acetic acid 0.2M (2×15 vol.) and water (2×15 vol.). Substitution levels of the immobilized ligand on the gels were estimated by elemental analysis from the percentage of nitrogen and sulphur atoms.

EXAMPLES 1-9

In the following example $1R_1$ is a 2-naphtalenesulfonyl moiety described by Kohler et al. as having affinity for Bovine Serum Albumine (BSA) [Koehler, Michael F. T. et al., *Bio. Med. Chem. Letters*, 2002, 12, 2883-2886]. The following example is using D,L-homocysteine thiolactone Ia as a scaffold and the described chemistry (cf. Scheme 1 above). After formation of the sulfonamide bound by reacting homocysteine thiolactone Ia with 2-naphtalensulfonyl chloride, the opening of the thiolactone ring is realised with an amine and the resulting compound further coupled to an epoxy-activated Sepharose™ 6 Fast Flow.

Example 1

Step 1: 6.8 g (44.1 mmol) of D,L-homocysteine thiolactone hydrochloride were dissolved in 100 ml of DCM and 16.1 ml (92.6 mmol) of DIPEA and cooled down to 0° C. To this solution, 10.0 g (44.1 mmol) of 2-naphtalenesulfonyl chloride in 50 ml DCM were added slowly at room temperature according to Step 1 and the reaction mixture stirred for another 16 h. The solvent was removed under vacuum and ethyl acetate (300 ml) was added. The organic phase was washed with citric acid (10% in water w/w) (2×100 ml). The organic phase was dried with sodium sulfate before evaporation and 13.1 g of a white powder recovered. Yield: 96%.

Step 2: 260 mg (0.70 mmol) of product issued from Step 1 was dissolved in 6 ml of THF. To this degassed solution (10 min bubbling of nitrogen), 0.334 ml (3.4 mmol) of n-butylamine was added and the mixture stirred at room temperature for 16 h. The solvent removed, the crude material was dissolved in 1 ml methanol and purified by Reverse phase HPLC using a gradient from 100% water to 100% acetonitrile in 10 min. 265 mg of a white powder was recovered. Yield: 84%.

Step 3: 38 mg (0.1 mmol) of product from Step 2 were dissolved in 5 ml of NaOH 1N. To this ligand solution, 8 ml of epoxy activated Sepharose™ (with a loading of 15 µmol/ml of gel) were added the reaction mixture was left on a shake board overnight at 50° C. The gel 1 was then washed with water, ethanol, water, acetic acid 0.2M and water.

Example 2

Step 1: A solution of benzoyl chloride (0.87 ml, 7.5 mmol) in 5 ml DCM was added dropwise to a solution of D,L-homocysteine thiolactone (1.15 g, 7.5 mmol) and DIPEA (2.6 ml, 15 mmol) in dichloromethane (DCM, 15 ml) at 0° C. The mixture was stirred overnight at room temperature. The solvent was evaporated under vacuum and the reaction residue was extracted with ethyl acetate (30 ml). The organic phase was washed with aq. citric acid 10% (w/w, 20 ml), aq. $K_2CO_3$ 10% (20 ml), water (20 ml), and dried with sodium sulphate. After filtration, the solvent is removed yielding a white solid (1.37 g, 83%).

Step 2: Aniline (3.125 ml, 34.67 mmol) and the above compound (750 mg g, 3.39 mmol) were mixed and stirred at 100° C. under nitrogen atmosphere. The reaction was monitored by LC-MS and after 6 h the mixture was allowed to cool to room temperature. The crude product was purified by flash chromatography using EtOAc and cyclohexane (1:2) as starting mobile phase yielding a light pink solid as compound 5 (700 mg, 65%).

Step 3: Coupling was performed following the general description.

Example 3

Step 1: The same procedure as described in Example 2-Step 1 was used.

Step 2: The compound from step 1 (0.194 g, 0.875 mmol) and 3,4-dihydroxybenzylamine hydrobromide (0.963 g, 4.38 mmol) were mixed together with DIPEA (1.55 ml) in THF (100 ml) under nitrogen-atmosphere. The non-homogenous mixture was refluxed at 100° C. and the reaction was monitored by LC-MS. After 24 h the mixture was allowed to cool to room temperature and the solvent was evaporated under vacuum to give a yellow solid. The crude product was purified by flash chromatography using EtOAc and cyclohexane (1:2) as starting mobile phase yielding a white solid (120 mg, 38%).

Step 3: Coupling was performed following the general description.

Example 4

Step 1: The same procedure as described in Example 2-Step1 was used.

Step 2: 3-Aminophenol (2.96 g, 27.12 mmol) was mixed with dry THF (10 ml) and cooled to 0° C. DIBAL-H (1.0 M) in toluene (4.2 ml, 4.2 mmol) was added under Argon-atmosphere. The reaction mixture was left in the ice bath. After 2 h the reaction mixture became partly solid and a solution of compound obtained above (1.0 g, 4.52 mmol) in dry THF (9.5 ml) was added dropwise at room temperature during 30 min. The reaction mixture was stirred for 2 h after the addition. The reaction was quenched 6 h after the addition of the compound from step 1, by cooling the mixture to 0° C. and addition of water (2.5 ml). The pH was adjusted from 6 to 4.5 by addition of 1 M aqueous $KHSO_4$ (5.5 ml). White crystals precipitated and the reaction mixture was extracted with EtOAc (50 ml), washed with a pH 3 citric acid aq. solution (3×40 ml), and washed with water (40 ml), dried with $Na_2SO_4$, filtered and concentrated. The crude product was purified by flash chromatography using EtOAc:cyclohexane (1:2) as mobile phase yielding a yellow solid (790 mg, 53%).

Step 3: Coupling was performed following the general description.

Example 5

Step 1: The same procedure as described in Example 2-Step 1 was used.

Step 2: Compound from step 1 (1.0 g, 4.52 mmol) was dissolved in THF (60 ml) under a nitrogen atmosphere. Ethanolamine (1.37 ml, 22.60 mmol) was carefully added to the reaction mixture at room temperature. After 6 h the solvent was evaporated under vacuum and a pink oil was obtained. The crude product was purified by flash chromatography using EtOAc as starting mobile phase yielding a white solid (1.1 g, 83%).

Step 3: Coupling was performed following the general description.

Example 6

Step 1: D,L-Homocysteine thiolactone hydrochloride (10 g, 65 mmol) was dissolved together with DIPEA (22.6 ml, 130 mmol) in DCM (150 ml). The mixture was cooled to 0° C. before addition of 3-methoxybenzoyl chloride (9.1 ml, 65 mmol). The reaction mixture was stirred over night at room temperature. The solvent was evaporated under vacuum and the residue obtained was dissolved in EtOAc (300 ml) and extracted with a citric acid solution 10% (w/w) (2×100 ml). The organic phase was, washed with an aq. solution of $K_2CO_3$ 10% (w/w) (2×100 ml), water (2×100 ml), dried with anhydrous $Na_2SO_4$, filtered and evaporated under vacuum to give a white solid (15.4 g, 94%).

Step 2: Compound obtained in step 1 (3.0 g, 11.94 mmol) and benzyl amine (6.52 ml, 59.69 mmol) were mixed in THF (50 ml) at room temperature under nitrogen atmosphere to form a clear yellow solution. After 4 h the solvent was removed under vacuum to give a yellow oil as crude product. The crude product was purified by flash chromatography using EtOAc and cyclohexane (1:2) as starting mobile phase yielding a white solid (3.41 g, 80%).

Step 3: Coupling was performed following the general description.

Example 7

Step 1: The same procedure as described in Example 6-Step1 was used.

Step 2: 3-Aminophenol (1.3 g, 11.94 mmol) was mixed with dry THF (10 ml) and cooled to 0° C. DIBAL-H (1.0 M) in toluene (10 ml, 10 mmol) was added under Argon-atmosphere. A clear yellow solution was formed which turned dark green after 15 minutes. After 2 h a solution of the compound obtained from step 1 (1.0 g, 3.98 mmol) in dry THF (13 ml) was added dropwise at room temperature. The reaction mixture was stirred for 2 h after the addition. The reaction was quenched 4 h after the addition of the compound from step 1, by cooling the mixture to 0° C. and addition of water (4 ml). An orange solid formed. The pH of the mixture was adjusted from 6 to 4.5 by addition of 1 M aqueous $KHSO_4$ (5.5 ml). The reaction mixture was extracted EtOAc (50 ml) and extracted (4×40 ml) with a citric acid buffer solution at pH 3. The organic phase was washed with water (40 ml), dried with $Na_2SO_4$, filtered and concentrated to give a yellowish sticky solid. The crude product was purified by flash chromatography using EtOAc and cyclohexane (1:2) yielding a white solid (920 mg, 64%).

Step 3: Coupling was performed following the general description.

Example 8

Step 1: D,L-Homocysteine thiolactone hydrochloride (10 g, 65 mmol) and DIPEA (22.6 ml, 130 mmol) were dissolved in DCM (120 ml). The mixture was cooled to 0° C. before addition of 1-naphtoyl chloride (12.4 g, 65 mmol) in DCM (30 ml). The reaction mixture was stirred over night at room temperature. The solvent was evaporated under vacuum and the crude retaken in EtOAc (300 ml) and extracted, with a citric acid solution 10% (w/w) (4×100 ml), an aq. solution of $K_2CO_3$ 10% (w/w) (4×100 ml), water (100 ml), dried with anhydrous $Na_2SO_4$, filtered and evaporated under vacuum to give a white solid (12.8 g, 73%).

Step 2: 3-Aminophenol (1.21 g, 11.06 mmol) was mixed with dry THF (10 ml) and cooled to 0° C. DIBAL-H (1.0 M) in toluene (9.21 ml, 9.21 mmol) was added under argon atmosphere. After 2 h a solution of compound from step 2 (1.0 g, 3.69 mmol) in dry THF (27 ml) was added dropwise at room temperature. The reaction mixture was stirred for 2 h. The reaction was quenched 3 h after the addition of the compound from step 1 by cooling the mixture to 0° C. and addition of water (4 ml). The pH of the mixture was adjusted from 6 to 5 by addition of 1 M aqueous $KHSO_4$ (7.5 ml). The reaction mixture was extracted with EtOAc (55 ml) and an aq. citric acid solution at pH 3 (4×40 ml). The organic phase was washed with water (40 ml), dried with $Na_2SO_4$, filtered and concentrated to give a yellow solid. The crude product was purified by flash chromatography using EtOAc and cyclohexane (1:2) yielding a white solid (850 mg, 61%).

Step 3: Coupling was performed following the general description.

Example 9

Step 1: 3-Hydrobenzoic acid (1.0 g, 7.24 mmol) was dissolved in dry DMF (56 ml) under an argon atmosphere. N-methylmorpholine (1.0 ml, 1.23 mmol) was added and the clear solution was cooled to 0° C. before the dropwise addition of isobutyl chloroformate (0.94 ml, 7.24 mmol). The mixture was stirred for 60 min and an orange solution was formed. A solution of D,L-homocysteine thiolactone hydrochloride (1.34 g, 8.69 mmol), dry DMF (30 ml), dimethylaminopyridine (63 mg, 0.52 mmol) and N-methylmorpholine (1.38 ml, 12.53 mmol) was added dropwise to the reaction mixture during 45 min. After 4 h sat $NH_4Cl$ (400 ml) was added to the mixture. The solution was well mixed and extracted with EtOAc (3×100 ml). The combined org. layers were extracted with a citric acid solution 10% (w/w) (3×100 ml), aq. solution of $K_2CO_3$ 10% (w/w) (3×100 ml), water, dried with anhydrous $Na_2SO_4$, filtered and evaporated under vacuum to give a yellow oil, which was submitted to flash chromatography using EtOAc and cyclohexane (1:2) as yielding a white solid (530 mg, 31%).

Step 2: A solution of DIBAL-H (1.0 M) in toluene (5 ml, 5 mmol) was added under Argon atmosphere to a solution of 3-aminophenol (0.65 g, 5.94 mmol) in dry THF (5 ml) at 0° C. After 2 h a solution of compound obtained in step 1(0.47 g, 1.98 mmol) in dry THF (6 ml) was added dropwise at room temperature. The reaction was quenched 2 h after the addition of the compound from step 1 by cooling the mixture to 0° C.

and addition of water (2 ml). An orange solid formed. The pH of the mixture was adjusted from 5 to 4 by addition of 1 M aqueous $KHSO_4$ (3 ml). The reaction mixture was mixed with EtOAc (20 ml) and extracted (4×20 ml) with a citric acid buffer solution at pH 3. The organic phase was washed with water (40 ml), dried with $Na_2SO_4$, filtered and concentrated to give a yellow solid. The crude product was purified by flash chromatography using EtOAc and cyclohexane (4:1) as starting mobile phase. Since the product still contained 3-aminophenol, AcOEt (40 ml) was added and another extraction performed with HCl 1M. The organic phase was washed with water at pH 7 (2×40 ml), dried with $Na_2SO_4$, filtered and concentrated to give a white solid as compound 11 (210 mg, 10%).

Step 3: Coupling was performed following the general description.

TABLE 1

| Example | Structure of gel | Ligand substitution level (μmol/ml) |
|---|---|---|
| Gel 1 | | Not Determined |
| Gel 2 | | 9 |
| Gel 3 | | 9.5 |
| Gel 4 | | 9 |
| Gel 5 | | 11.5 |
| Gel 6 | | 10 |

TABLE 1-continued

| Example | Structure of gel | Ligand substitution level (µmol/ml) |
|---|---|---|
| Gel 7 | 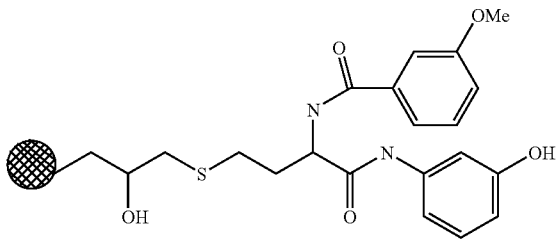 | 9.5 |
| Gel 8 | 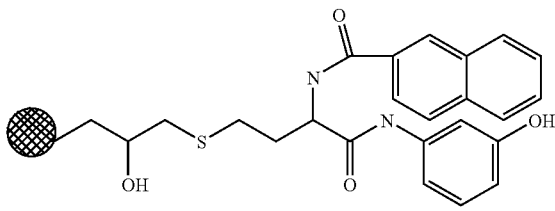 | 9 |
| Gel 9 | 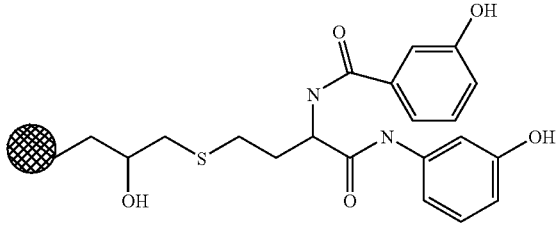 | 6 |

EXPERIMENTAL REFERENCE PROCEDURES FOR AFFINITY TEST

Chromatography System:

All experiments were performed at room temperature using an ÄKTA™ Explorer 100 chromatography system (Amersham Biosciences AB) equipped with a Unicorn 3.1 software.

Test 1: Deoxycorticosterone
Injection volume: 10 µl (10 mg BSA in eluent A)
Flow rate: 0.3 ml/min.
Eluent A: 20 mM phosphate in MQ Milli-Q water, pH 7.2
Eluent B: 20 mM phosphate and 2M NaCl in MQ Milli-Q water, pH 7.2 Elution: Linear gradient (0-100% B)
Gradient condition: Column equilibration=5 column volumes (CV), gradient volume=10 CV and cleaning of column (after gradient) with 100% B=2 CV
Detection wavelength: 215, 254 and 280 nm

What is claimed is:

1. A method of preparing at least one affinity ligand, which method comprises
    (a) providing a cyclic scaffold comprising a thiol group, a carbonyl group and an amine group;
    (b) derivatising the amine group of said scaffold with an electrophile that carries either a functionality capable of affinity interaction or a functionality capable of a second interaction with a target molecule; and
    (c) opening up the cyclic structure of the derivatised scaffold and adding to the carbonyl carbon an amine that carries either a functionality capable of a second interaction or a functionality capable of affinity interaction with a target molecule;
    to result in a ligand capable of affinity interaction with one site of a target molecule and a second functionality capable of interacting with another site of the same target molecule.

2. The method of claim 1, wherein the functionality that is capable of providing affinity interaction is a known affinity ligand, and the method results in a ligand of modified characteristics as compared to said known affinity ligand.

3. The method of claim 1, wherein step (b) is performed with an electrophilic carboxyl acid carrying a functionality capable of affinity interaction and step (c) adds an amine that carries a second functionality.

4. The method of claim 1, wherein step (b) is performed with an electrophile carrying a second functionality and step (c) adds an amine that carries a functionality capable of affinity interaction.

5. The method of claim 1, wherein the scaffold is defined by the general formula (I)

wherein A, B and X irrespective of each other are carbon atoms or heteroatoms, m is any integer between 0 and 4, and the functional group N is a nitrogen, which either replaces one X or is attached to any one of A, B and X.

6. The method of claim 5, wherein in formula (I), A, B and X are carbon atoms.

7. The method of claim 5, wherein in formula (I), m is 1 and the scaffold is homocysteine thiolactone.

8. The method of claim 1, wherein the electrophile is selected from the group consisting of compounds containing carbon-carbon double bonds conjugated to Y, wherein Y is a halogen, a mesylate group, a tosylate group, an acid or an activated acid.

9. The method of claim 1, wherein the functionality capable of affinity interaction is one member of an affinity pair.

10. The method of claim 1, wherein the functionality is capable of interacting with a target molecule by another interaction than affinity.

11. The method of claim 1, wherein steps (a) and (b) have been performed earlier to provide a ready-derivatised scaffold.

12. The method of claim 1, wherein the product obtained from step (c) is immobilised via its thiol group to a base matrix in order to produce an affinity separation medium comprising a plurality of affinity ligands.

13. The method of claim 12, wherein the thiol group is coupled to allyl groups of the base matrix.

* * * * *